(12) United States Patent
Scharfenort et al.

(10) Patent No.: US 8,579,204 B2
(45) Date of Patent: Nov. 12, 2013

(54) METHOD AND DEVICE FOR TRACEABILITY MARKING AND PACKAGING LINE PROVIDED WITH TRACEABILITY MARKING DEVICE

(75) Inventors: Per Scharfenort, Furulund (SE); Hans Johansson, Lomma (SE); Lars Bergholtz, Höganäs (SE); Lars Sickert, Lund (SE); Paolo Benedetti, Modena (IT); Guido Wiener, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 89 days.

(21) Appl. No.: 13/123,277

(22) PCT Filed: Sep. 25, 2009

(86) PCT No.: PCT/SE2009/000426
§ 371 (c)(1),
(2), (4) Date: May 12, 2011

(87) PCT Pub. No.: WO2010/042001
PCT Pub. Date: Apr. 15, 2010

(65) Prior Publication Data
US 2011/0204137 A1    Aug. 25, 2011

(30) Foreign Application Priority Data
Oct. 9, 2008 (SE) .................................. 0802123

(51) Int. Cl.
*G06F 17/00* (2006.01)
*G06K 19/00* (2006.01)
*G06K 19/06* (2006.01)
*B65B 61/26* (2006.01)
*B65B 61/00* (2006.01)

(52) U.S. Cl.
USPC .......... 235/493; 235/375; 235/487; 53/131.2; 53/135.3

(58) Field of Classification Search
USPC ............... 235/375, 487, 493; 53/131.2, 135.3
See application file for complete search history.

(56) References Cited

U.S. PATENT DOCUMENTS 4,836,378 A * 6/1989 Lephardt .................... 206/459.5
5,704,190 A * 1/1998 Kaneko et al. .................... 53/51

(Continued)

FOREIGN PATENT DOCUMENTS

CN       101036152 A      9/2007
EP       0705759 A        4/1996

(Continued)

OTHER PUBLICATIONS

"Laser Marking Has a Bright Future in Plastics," Plastics Technology (Aug. 2001), 5 pages.*

(Continued)

*Primary Examiner* — Seung Lee
*Assistant Examiner* — Claude J Brown
(74) *Attorney, Agent, or Firm* — Buchanan Ingersoll & Rooney PC

(57) ABSTRACT

The present invention relates to a method for visualization of non-visible information on a packaging material to provide traceability. The method comprises the steps of: reading the non-visible information from the packaging material by means of a magnetic head reader, processing the non-visible information in a central processing unit together with additional new non-visible information, and printing an optional portion of the amount of combined non-visible information onto the packaging material as a traceability marking. The invention also relates to a device for carrying out the method and a packaging line with a filling machine making use of the device.

15 Claims, 3 Drawing Sheets

(56) References Cited

U.S. PATENT DOCUMENTS

| | | | | |
|---|---|---|---|---|
| 5,896,293 A | * | 4/1999 | Teramoto et al. | 700/111 |
| 6,924,077 B2 | * | 8/2005 | Delp et al. | 430/270.1 |
| 2003/0094487 A1 | * | 5/2003 | Blankenship et al. | 235/375 |
| 2006/0259182 A1 | * | 11/2006 | Mantell | 700/213 |
| 2007/0121158 A1 | * | 5/2007 | Panunto et al. | 358/1.15 |

FOREIGN PATENT DOCUMENTS

| WO | 2006/038114 A1 | 4/2006 |
|---|---|---|
| WO | WO 2006/135313 A1 | 12/2006 |

OTHER PUBLICATIONS

International Search Report (PCT/ISA/210) issued on Jan. 20, 2010, by Swedish Patent Office as the International Searching Authority for International Application No. PCT/SE2009/000426.

English language translation Chinese Office Action dated Jun. 20, 2013 issued in the corresponding Chinese Patent Application No. 200980138905.2.

* cited by examiner

METHOD AND DEVICE FOR TRACEABILITY MARKING AND PACKAGING LINE PROVIDED WITH TRACEABILITY MARKING DEVICE

TECHNICAL FIELD

The present invention relates to a method for visualization of non-visible information on a packaging material to provide traceability, a device for carrying out the method and a packaging line with a filling machine making use of the device.

TECHNICAL BACKGROUND

Within the food packaging industry, just like in other fields, the importance of being able to provide traceability throughout the value chain has recently increased. Here the word traceability refers to the possibility of being able to trace and control for example the origin of the packaging laminate, converting parameters, product process parameters, and parameters for packaging, sterilising and filling in a packaging line. More in detail it refers to the possibility of being able to determine the origin of the base material from which the packaging laminate is made of, from which batch and reel the packaging laminate is originating, from where the product originates (farm/producer, batch), how the product has been treated in the processing plant, and how the filling and packaging has been performed (filling machine type and id, dairy/packaging plant, sterilization parameters, packaging date). The latter information may be used to generate a best-before-date for the package with content.

Traceability throughout the value chain facilitates quick recall of packages and the possibility of ensuring a high quality of the final product and, in the end, such offers safety for the consumer and consumer trust for the food producer.

In practice, traceability is a complex issue. The value chain for e.g. a milk package is long and with several involved parties and numerous process steps. Paper and polymer granules are manufactured and supplied to the packaging laminate producer which in turn, through converting processes, manufactures packaging laminate. The packaging laminate is delivered to the dairy where it is loaded in the filling machines. The dairy also receives milk from one or several nearby farms and processes the milk within the processing plant of the dairy. After processing, the milk is supplied to the filling machine for packaging. The filling machine produces packages and subsequently said packages are distributed to stores where consumers may pick them from the shelves and buy them.

It is known within the packaging industry to provide a packaging laminate having magnetisable particles with a possibility for magnetic marking. Some various aspects are disclosed in WO 2006/135313 and EP-0 705 759, in which several applications are disclosed.

All relevant traceability data for a packaging material laminate, e.g. batch number and reel number which traces back to base materials and converting processes information, can magnetically be encoded and read if the laminate comprises suitable magnetic particles arranged as strips, marks, fully covered surfaces or by other means. The magnetic mark may function as an information carrier, keeping non-visible information.

The latest development of magnetic sensors allows reading without physical contact between the sensor and the layer with magnetic particles. A readings distance up to 1-2 mm is practically possible. This allows the magnetic layer to be located non-visible on the ready made package, e.g. on the opposite side from printing on a paperboard, thus saving space for graphics and written information on the surface of the package.

SUMMARY

In general words, the inventive concept relates to making a traceability marking readable to the human eye in an automated operation.

The present invention provides a method for visualization of non-visible information on a packaging material to provide traceability. The method comprises the steps of: reading the non-visible information from the packaging material by means of a magnetic head reader, processing the non-visible information in a central processing unit together with additional new non-visible information, and printing an optional portion of the amount of combined non-visible information onto the packaging material as a traceability marking.

In one embodiment the non-visible information read from the packaging material regards unique package identification information. Said unique package identification information may be used to access packaging material traceability and processing data.

In another embodiment the non-visible information read from the packaging material regards packaging material traceability and processing data.

In one embodiment the additional new non-visible information regards one or several of the following: food product traceability and processing data, packaging process data, consumer-directed information, package identification, and retail and distribution information.

In a further embodiment the method comprises the step of uploading and storing the non-visible information read from the packaging material on a server, and wherein the method also comprises the steps of: uploading and storing said additional new non-visible information on a server, and linking said non-visible information to the additional new non-visible information.

In yet an additional embodiment the printing step is performed by using a laser marker and printing on laser sensitive areas of the packaging material.

In one embodiment said laser sensitive areas comprises laser sensitive ink, wherein the packaging material is a packaging laminate and wherein said ink is provided in the packaging laminate such that the ink is covered by an outer transparent polymer layer of the packaging laminate.

In a further embodiment said laser sensitive areas comprises laser sensitive pigments, wherein the packaging material is a packaging laminate and wherein said pigments are provided in one of the layers of the packaging laminate, preferably in the outer polymer layer.

In another embodiment the packaging material is a secondary package.

The present invention also relates to a device for performing the previously described method, said device comprising a magnetic head reader, a central processing unit, and a printer, wherein the printer is a laser marker.

The present invention also relates to a packaging line with a filling machine comprising the earlier described device, and further comprising a receiving section receiving the packaging material and further sections where the packaging material is formed into packaging containers, which are filled with a product, sealed and folded into finished packaging containers.

DESCRIPTION OF EMBODIMENTS

Figure 1:
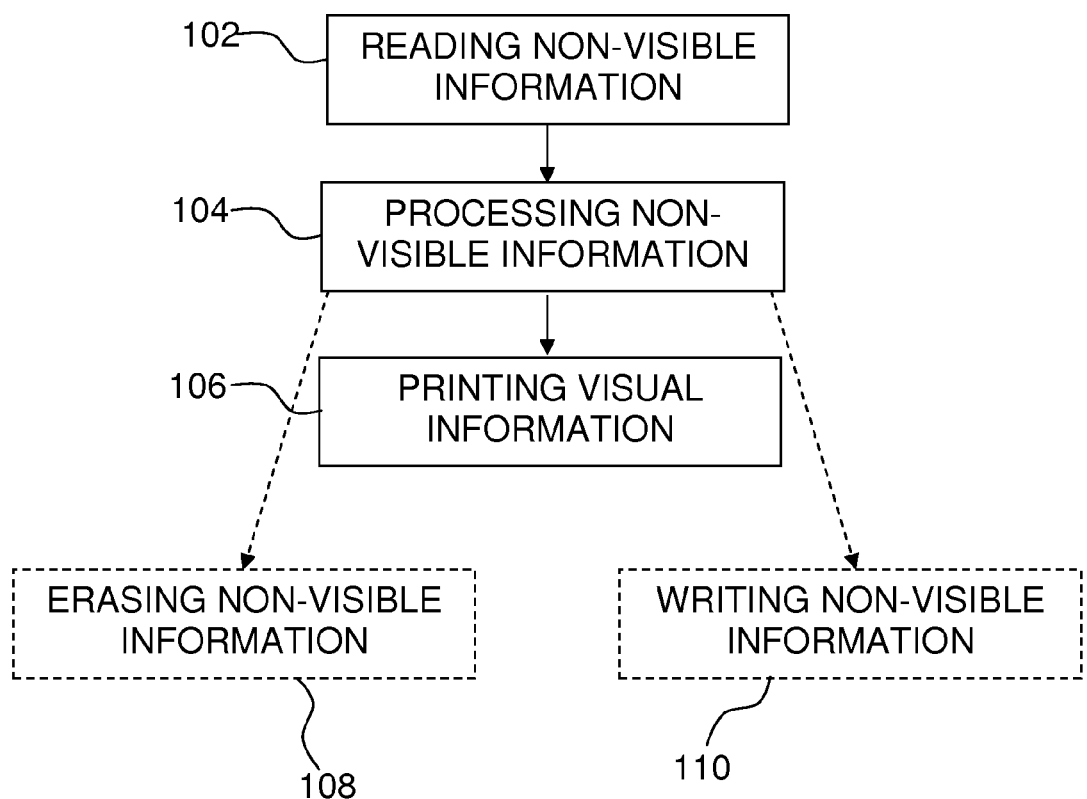
FIG. 1 is a flowchart illustrating the inventive method, and some embodiments thereof.

FIG. 1 is a flow chart illustrating the inventive method and some embodiments thereof. In a first step 102 non-visible information is read from an information carrier mark in the packaging material. In a second step 104 the non-visible information, or selected portions thereof, is processed together with new non-visible information, and thereafter a selected portion of the amount of combined non-visible information is printed onto the packaging material in a third step 106. Further embodiments of the invention may comprise the step of erasing non-visible information 108 and/or the step 110 of writing additional non-visible information.

Figure 2:
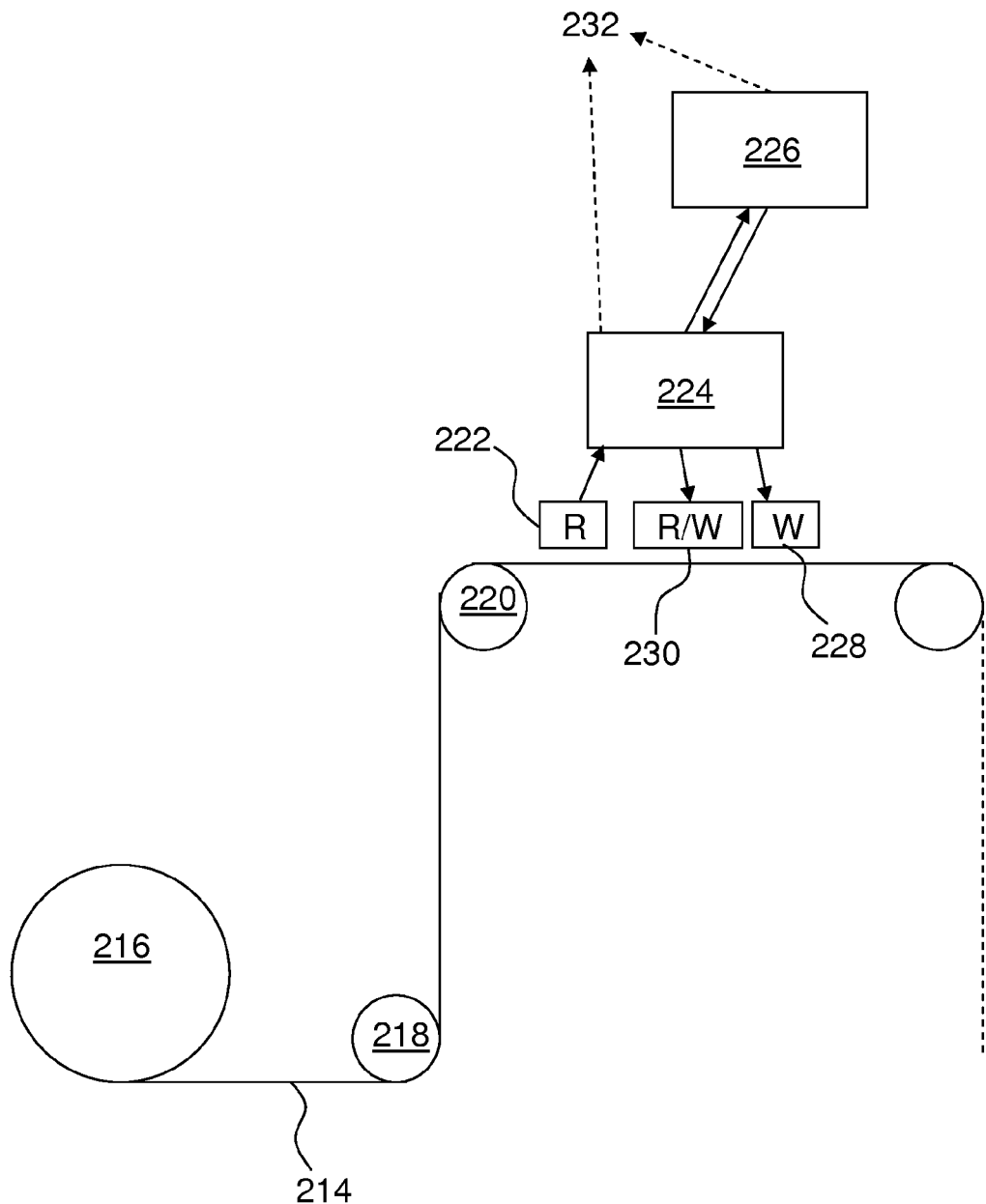
FIG. 2 is a schematic side view of a device performing the inventive method according to a first embodiment.

FIG. 2 illustrates a schematic drawing of a first embodiment of a device performing the inventive method. It should be noted that the following description also includes description of features only relevant on a subclaim level, and that the described device is able to perform the inventive method, and more.

In FIG. 2 it is illustrated how a packaging material in the form of a packaging laminate, in a filling machine, is led in the form of a web 214 from a magazine reel of material 216, via rollers 218, 220, past a reading unit 222, and one or more writing units 228, 230. In the reading unit 222 the non-visible information, which is arranged in one or several magnetisable strips or layers (not shown) in the packaging material, is read by means of a magnetic reading head and uploaded to a central processing unit 224. In the central processing unit 224 (CPU) the information is processed. The information may be forwarded to a database on a server 226 for storage. The information is also combined with or linked to new additional non-visible information uploaded to the central processing unit 224. The additional information may optionally be stored in the central processing unit 224 and/or forwarded to the server 226 for storage. The non-visible information coming from the packaging material laminate and the new additional non-visible information may be stored together or in separate databases provided that a link between the amounts of information is created.

It is to be noted that the central processing unit 224 may be located in the server 226 or for example in an operational unit of the packaging line or the filling machine. Further, it is to be noted that the central processing unit 224 may in fact comprise two or more central processing units, optionally located in different locations, co-operating to process the information.

Preferably, the non-visible information read from the packaging laminate regards unique package identification information. Each repeat length of the packaging laminate web is provided with an unique package identification in the form of a number, code or similar. The word repeat length refers to a portion of the material web corresponding to one package. Preferably, the identification number or code has been written by magnetic encoding onto the packaging laminate during manufacturing thereof. The packaging material manufacturer has linked the number or code to information stored in a central processing unit and/or in a server at the manufacturing plant or elsewhere. That information regards packaging material traceability and processing data. Such information may be for example information about the origin of the base material from which the packaging laminate is made of, information about which batch and reel the packaging laminate is originating and converting parameters etc. By making the identification information visible on the package it is, in principle, possible for the food producer or dairy to trace the package all the way back to the base material by communicating the packaging material manufacturer.

It may be that, for small package volumes and/or high production speeds, there are provided an unique identification per set of a row of packages, for example an unique identification per three successive packages (three repeat lengths). Thus, the three packages will have the same identification, but may optionally be distinguished by a suffix; XXX-a, XXX-b and XXX-c (where XXX represents the identification and a, b and c represent the suffix).

The non-visible information read from the packaging laminate may comprise other information than package identification information. It may in fact contain all packaging material traceability and processing data itself.

Preferably, the additional new non-visible information regards one or several of the following: food product traceability and processing data, packaging process data, consumer-directed information, package identification and retail and distribution information. This information may come from different sources.

Food product traceability and processing data relates to information about for example product origin, ingredients, nutrition information, product processing parameters and identification of the processing site or plant. The source may be process sensors and other means such as a processing plant information unit.

The packaging process data relates to information from the packaging line about for example packaging date, best-before-date, packaging site or plant, filling machine type, filling machine identification, filling machine parameters, information from distribution equipment downstream the filling machine (tray or box packers, shrink film packers, palletizers etc) and information about additional materials being added to the packaging laminate or the final packaging containers like for example straws, spoons and post-applied caps or polymer material being injection moulded on the packaging material for forming a packaging container top or an opening device. The source may be the control system (PLC/other) of the packaging line.

The package identification may be a new identification to be used together with the identification read from the packaging laminate or a new identification replacing the one from the packaging laminate. The identification may be for example in the form of an alphanumeric number or a code; for example one dimensional code such as for example a barcode, i.e. an EAN code or a two dimensional code such as for example a Data Matrix. A Data Matrix code is a matrix barcode consisting of black and white "cells" or modules arranged in either a square or rectangular pattern. The information to be encoded can be text or raw data. Usual data size is from a few bytes up to 2 kilobytes. The cells represent bits. Depending on the situation a "light" module is a 0 and a "dark" module is a 1, or vice versa.

By making some or all of the additional information visible on the package it is, in principle, possible for the food producer or dairy to obtain full traceability of the package and its content.

The retail and distribution information may be any kind of information generated in the retailing and distribution chain such as for example pallet unpacking date/time, transports, storing times and places etc.

The new additional information may also be consumer-directed information such as for example be advertisements from producer or other party, food recipes, lotteries, contests, reports or stories and markings or labels to show for example fair trade or ecological production. This information may be changed instantly, for example between packages or batches. Further, this information may constitute text, symbols, trademarks, images or combinations thereof. An additional type of consumer-directed information may be package disposal information, for example information to the consumer about how the packaging container should be sorted for recycling purposes or the amount of money paid if returning an empty packaging container to the shop. An additional type of consumer-directed information is closely related to the previously described food product traceability and processing data; list of product content, product origin and nutrition information. Instead of having such information provided in the décor or print of the packaging laminate already from the converting factory, the producer may choose to instantly write this type of information onto the packages upon manufacturing of the packages. This would be typically advantageous if the producer manufactures small batches. An example would be an orange juice producer. One day the oranges used in production originates from one farm or country, and the day after the oranges used originates from another farm or another country. By leaving out the list of contents or the content origin in the décor of the packaging laminate, the invention could be used to instantly print this information upon producing the packages. Thereby, it is made more economically feasible for a producer to give the consumer more detailed information about for example the origin of the product. The same advantage applies when a producer distributes its products to several countries, and needs to adapt the language used on the packages to each specific country.

With regard to the embodiment shown in FIG. 2, the non-visible information and additional information may, as have been mentioned, be sent forward to a server 226 for storage and access. The server 226 and/or the central processing unit 224 may communicate with auxiliary appliances 232, either within the packaging line, the filling machine or with other processing units. In the central processing unit 224, or in the server 226, it is decided based on preset requests, what information is to be visually printed onto the packaging container. As been mentioned before the central processing unit may be located in the server or in an operational unit of the packaging line or the filling machine. Further, it is to be noted that the central processing unit may in fact comprise two or more central processing units, optionally located in different locations, co-operating to process the information.

The writing unit 228 is a printer operable to print the information onto the packaging laminate, when it is in the form of a web 214, as it has been reshaped into a packaging container (not shown), or somewhere in between. The writing unit 228 may be any type of conventional printer previously used for the purpose of printing onto a packaging laminate.

The print on each package provides a traceability marking readable with the human eye.

The printer or printing equipment is of the kind that can provide variable printing, i.e. that can provide a print unique to each package and/or a print that can be instantly changed. Preferably, the printer or printing equipment also needs to be able to perform printing at very high speeds. Today there are filling machines running the packaging material web at a speed of 1.2 meters per second.

In one embodiment the printer for making the visual print is a laser marker, printing the information onto a laser sensitive area on or in the packaging laminate. The laser sensitive area is provided with a laser sensitive material of the kind that changes color upon exposure to laser light. In this embodiment the laser sensitive material is a laser sensitive ink or coating.

The choice of laser sensitive pigment, or laser sensitive ink or coating, and laser or printing is within the competence of the skilled person, and will not be described in detail. However, there are several criteria that need to be met:

i) the dye/pigment ought to be approved for contact with food.
ii) the dye/pigment ought not to effect the strength of the packaging laminate.
iii) the dye/pigment ought to be exposed to extrusion-coating/lamination temperatures without being discoloured.
iv) the ink ought to be color stable with respect to UV-light, temperatures etc that it may be exposed to throughout the lifetime of the package.
v) the ink ought not comprise particles of a size larger than 5 μm.
vi) the ink ought to be applied in a sufficient amount in one single printing step.
vii) the ink ought to have a good adhesiveness to the material that it is applied to as well as to the polymer layer that will cover the ink.

Further, the laser sensitive ink may be transparent so that it may be printed at any spot on the package surface without taking the graphics of the package into account. If the laser sensitive ink is not transparent an empty area is needed on the packaging laminate to avoid interference with the underlying graphics.

The laser marker may be any suitable laser. Preferably, a near infra-red laser is used such as for example a diode array laser (wavelength: 650-1500 nm) or a fibre laser (wavelength: about 1060 nm). Further, a $CO_2$ laser (wavelength: 10.6 nm) may instead be used as well as a Nd:YAG laser.

The use of a laser marker has several advantages, one being that the laser sensitive material may be arranged on a surface being covered with a layer, such as the polyethylene layer often used to protect the paper core of the packaging material. In this way the print will have an inherent tamper proofing, i.e. it will be easier to detect if someone has tried to manipulate the print, for example manipulated a best-before-date. Further, the printing process will not be negatively affected if there is moisture on the outside of the packaging container, which could be the case with present technique in which one uses an ink printer to print on the outermost layer of the packaging laminate. Moisture may give a poor resolution and the ink may smear on the packaging laminate. Naturally, these are drawbacks that are undesirable, especially when printing 2D codes like for example of a DataMatrix. To this end it may be worth emphasizing that the laser marking may be performed without contact between the packaging laminate and the laser marker, and that the only output from the laser marker is laser radiation, whereby wear and clogging of the laser marker is virtually non-existing.

The print of a laser marker has high resolution and may have the same or almost the same quality as the graphics printed on the paper core using flexo print, offset print or other high quality printing method.

Upon exposure of the laser light to the laser sensitive ink, the ink reacts and changes color. The exposure may be made in that a picture is projected on the area of the laser sensitive ink. This picture may be created by means of sending homogeneous laser light through a computer-controlled screen. Said picture is then reproduced on the area of the laser sensitive ink. In this way the picture may be changed instantly, even between packages. Another alternative is to direct the laser beam with a computer-controlled movable mirror as is known in the art. In this case a pulsating laser beam may be used which will create points on the laser sensitive area.

Regarding the choice of laser sensitive material, such as laser sensitive ink, suitable wavelength for the laser, imaging optics, etc, this will be within the capacity of the skilled person having studied the inventive concept as described herein.

Laser sensitive ink has been described. However, it should be understood that the laser sensitiveness, provided by the laser sensitive material in the laser sensitive areas, does not need to be provided by means of application of an ink. The laser sensitive areas may be provided by means of application of laser sensitive pigments in the outermost polymer layer of the packaging laminate. With other words, the laser sensitive pigments are embedded in the transparent, protective polymer layer of the packaging laminate.

One embodiment has been described in which the printer for printing the visual print is a laser marker. Other printing techniques are of course also possible. For example, another alternative is to use conventional ink jet technology. The print is then made on the outmost layer of the packaging laminate.

The packaging laminate comprises, within the context of the present invention both, fibre-based packaging laminates and packaging laminates based on polymers alone. In the broadest sense, it comprises packaging laminates including layers of optional combinations of polymer, fibre, and inorganic material, such as metal, preferably aluminium foil.

Figure 3:
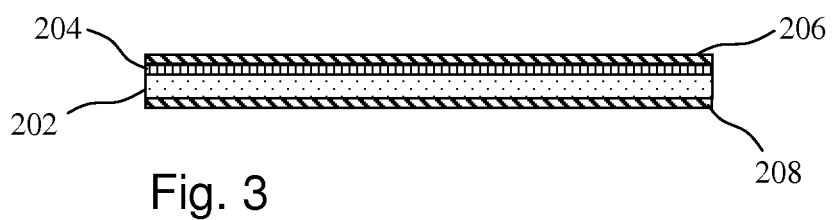
FIG. 3 is a schematic partial cross section of a packaging laminate web provided with an area of laser sensitive material.
Figure 4:
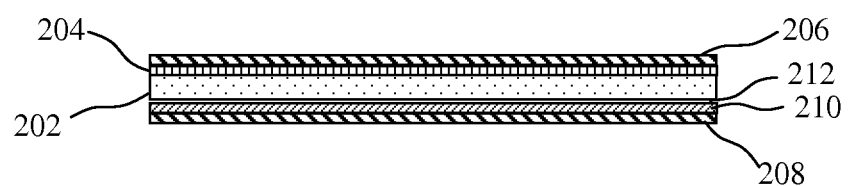
FIG. 4 is a schematic partial cross section of another packaging laminate web provided with an area of laser sensitive material.

An embodiment of a web of packaging laminate is shown in FIG. 3. The packaging laminate is provided with an area or a layer of laser sensitive ink. Further, the packaging laminate has a core layer 202 of paper or carton. The area or layer of laser sensitive ink 204 is provided on one of the side surfaces of the core layer 202, and the two layers are provided, on both sides, with a polymer layer, preferably a polyethene layer. The first polymer layer 206 is provided on the outside of the package, whereas the second polymer layer 208 is provided on the inside of the package. In FIG. 4 it is shown that a layer 210 of aluminium foil may be provided at the inside of the core layer 202 by means of an adhesive layer 212. In this case the inner polymer layer 208 is provided on the aluminium foil layer 210. In the embodiments of FIGS. 3 and 4 the magnetisable material are not shown.

The application of the magnetisable material onto the packaging laminate does not form part of the invention, yet some alternatives include arrangement of magnetisable particles in a printing ink, which is printed onto the packaging laminate, in one or more strip-shaped areas of the packaging laminate. The shape of the areas does not necessarily have to be strip-shaped, and the magnetisable areas may be arranged by attaching magnetisable tapes, instead of using a magnetisable ink.

If magnetisable particles are used they may comprise particles of an iron oxide, for example maghemite ($Fe_2O_3$) or magnetite ($Fe_3O_4$), but the invention is not limited to these oxides and in general not to the use of particles at all.

It should be noted that the magnetisable ink may be printed into the entire surface of the packaging laminate, ending up on the outside of the packaging container to be formed, on the inside of the same, or somewhere in between. Basically, the ink may be printed in any form ranging from printing in patches or lines to printing the entire surface. As has been briefly mentioned previously a combination of a patch (for example a register mark) and a line (for example an information carrier line) may be used.

The concentration of magnetisable particles after application may vary, yet a suitable range would be about 1-10 $g/m^2$, lower concentrations make it difficult to store information magnetically, and higher concentrations are unnecessary, and thus unnecessarily expensive. A preferred range may be about 2-4 $g/m^2$.

It should also be noted that even though a web-shaped packaging laminate has been described in the embodiment, a sheet-shaped packaging material is also possible.

Further, in the embodiment a packaging material in the form of a packaging laminate has been described. It should however be noted that the packaging material may be a secondary package. A secondary package may be for example a cardboard or plastic tray or box, heat-shrinkable film for use around one or several packaging containers or even a pallet. In this context the invention may be used for tracing a packaging container from a filling machine and backwards, but also for providing traceability from further downstream operations in the packaging line, as well as from operations in the retail and distribution chain. With the invention it may be possible, in a packaging line, to for example log and trace which packaging containers are loaded in a specific tray, and which trays are loaded on a specific pallet, or which packaging containers are forming a specific multi-pack, and to which specific pallet each multi-pack is loaded. In the retail chain it may be possible to log and trace for example pallet transports, pallet storing, pallet unpacking etc. For this reason it should be understood that the method of the invention may be used several times within a package value chain. This means that information from the last operation or step in the chain is combined with additional new information from the present operation or step. Alternatively, downstream operations generate more information that is accumulated in the already existing databases.

The method of the invention may further comprise the step of erasing selected portions of the non-visible information. Erasing the non-visible information may be performed by means of a magnetic head or a laser beam. If selected portions of the non-visible information are to be erased, this may be accomplished in the first reading unit 222 of FIG. 2, or in a subsequent reading/writing/erasing unit 230. The writing unit 228, when configured as a laser marker, may also be used to erase information by heating of the magnetisable material to a temperature on or above the Curie-temperature.

The invention claimed is:

1. A method for visualization of non-visible information on a packaging material to provide traceability, said method comprising:
   reading the non-visible information from a web of the packaging material by a magnetic head reader,
   processing the non-visible information in a central processing unit together with additional new non-visible information, and
   printing a selected portion of an amount of combined non-visible information onto the web of the packaging material as a visible traceability marking.

2. The method of claim 1, wherein the non-visible information read from the web of the packaging material regards unique package identification information.

3. The method of claim 2, wherein said unique package identification information may be used to access packaging material traceability and processing data.

4. The method of claim 2, wherein the non-visible information read from the web of the packaging material regards packaging material traceability and processing data.

5. The method of claim 1, wherein the additional new non-visible information regards one or several of the following:
food product traceability and processing data,
packaging process data,
consumer-directed information,
package identification, and
retail and distribution information.

6. The method of claim 1, further comprising:
uploading and storing the non-visible information read from the web of the packaging material on a first server or unit,
uploading and storing said additional new non-visible information on the first server or unit or on a second server or unit, and
linking said non-visible information to the additional new non-visible information.

7. The method of claim 1, wherein the printing is performed by using a laser marker and printing on laser sensitive areas of the packaging material.

8. The method of claim 7, wherein said laser sensitive areas comprises laser sensitive ink, wherein the packaging material is a packaging laminate and wherein said ink is provided in the packaging laminate such that the ink is covered by an outer transparent polymer layer of the packaging laminate.

9. The method of claim 7, wherein said laser sensitive areas comprises laser sensitive pigments, wherein the packaging material is a packaging laminate and wherein said pigments are provided in one of the layers of the packaging laminate.

10. The method of claim 7, wherein said laser sensitive areas comprises laser sensitive pigments, wherein the packaging material is a packaging laminate and wherein said pigments are provided in an outer polymer layer.

11. The method of claim 1, wherein the packaging material is a secondary package.

12. A device for performing a method for visualization of non-visible information on a packaging material to provide traceability, said device comprising a magnetic head reader, a central processing unit, and a printer, wherein the printer is a laser marker, said method comprising:
reading the non-visible information from a web of the packaging material by the magnetic head reader,
processing the non-visible information in the central processing unit together with additional new non-visible information, and
printing, by the printer, a selected portion of an amount of combined non-visible information onto the web of the packaging material as a visible traceability marking.

13. A packaging line with a filling machine comprising the device of claim 12, and further comprising a receiving section receiving the packaging material and further sections where the packaging material is formed into packaging containers, which are filled with a product, sealed and folded into finished packaging containers.

14. A method for visualization of non-visible information on a packaging material to provide traceability, said method comprising:
reading the non-visible information from a web of the packaging material by a magnetic head reader,
processing the non-visible information in a central processing unit together with additional new non-visible information,
printing a selected portion of an amount of combined non-visible information onto the web of the packaging material as a visible traceability marking, and
reshaping a portion of the web of packaging material into a packaging container.

15. A method for visualization of non-visible information on a packaging material to provide traceability, said method comprising:
reading the non-visible information from a web of the packaging material by a magnetic head reader,
processing the non-visible information in a central processing unit together with additional new non-visible information,
reshaping a portion of the web of packaging material into a packaging container, and
printing a selected portion of an amount of combined non-visible information onto the packaging container as a visible traceability marking.

* * * * *